July 25, 1933.    J. W. ANDERSON    1,919,681
LIQUID HEATER
Filed March 7, 1931

Inventor
J. W. Anderson
by J. Edw. Maybee
ATTY.

Patented July 25, 1933

1,919,681

UNITED STATES PATENT OFFICE

JOHN W. ANDERSON, OF BROOKLYN, NEW YORK; EMMA MARIA ANDERSON ADMINISTRATRIX OF SAID JOHN W. ANDERSON, DECEASED

LIQUID HEATER

Application filed March 7, 1931. Serial No. 520,951.

Figure 1:
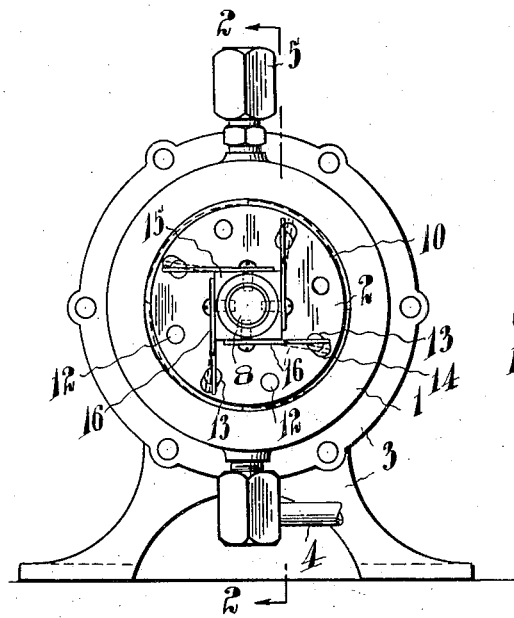
Figure 2:
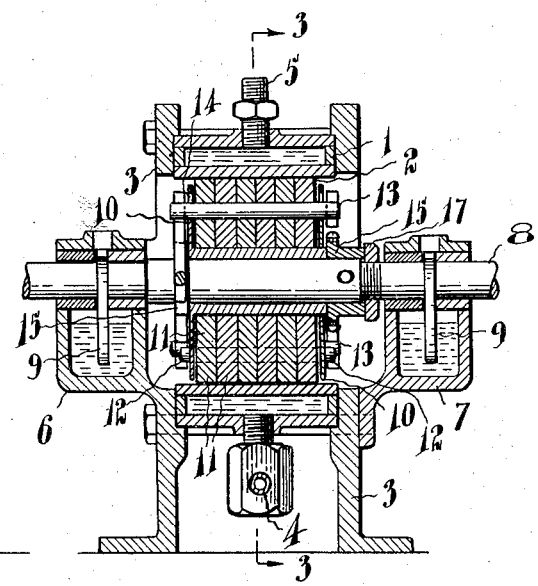
Figure 3:
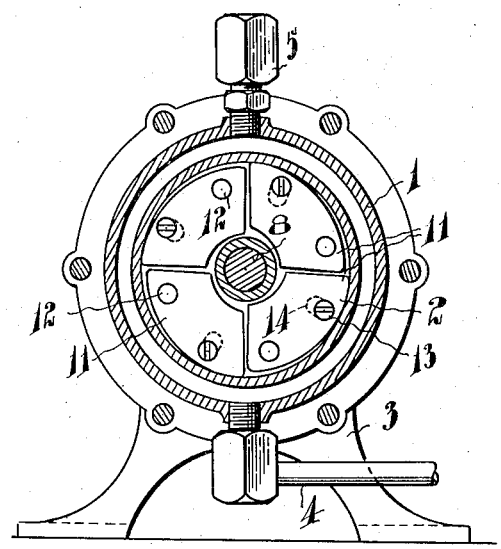

This invention relates to devices for heating water and other liquids, and particularly liquids which are enclosed in a closed circuit. The heater is constructed substantially as hereinafter described and illustrated in the accompanying drawing in which Fig. 1 is a side elevation of the heater;

Fig. 2 a cross section on the line 2—2 in Fig. 1;

Fig. 3 a section on the line 3—3 in Fig. 2; and

Figure 4:
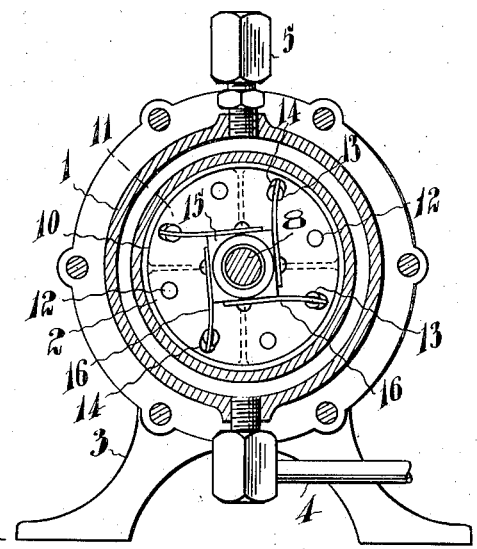

Fig. 4 a view similar to Fig. 2, but showing the device adjuster to decrease the pressure of the rubbing shoes.

In the drawing like numerals of reference indicate corresponding parts in the different figures.

The heater comprises a stator 1 and rotor 2. The stator 1 is formed as an annular hollow casing mounted upon a supporting frame 3. The casing is provided with an inlet 4 at its under side and an outlet 5 at its upper side. Carried by the stator are brackets 6 and 7 provided with bearings for the shaft 8 of the rotor. The brackets are preferably hollow to form recesses for oil for lubricating the shaft as it rotates in the bearings. A chain 9 or other pick up is carried by the shaft 8 within the recesses.

The rotor comprises a shaft 8 upon which is mounted spaced members 10, and between the members 10 are mounted rubbing or friction shoes 11. These shoes may be of wood, bone, fibre or other material and may be solid, but are preferably laminated as shown in Fig. 2. One end of each shoe is pivotally mounted upon a rod 12 extending between the members 10. Also extending between the members 10 are rods 13 which pass through slots 14 adjacent the tail ends of the shoes 11.

The shaft 8 may be the shaft of an electric motor, or it may be driven in any other suitable manner. Upon rotation of the shaft, and with it the members 10 and shoes 11, the tail ends of the shoes are moved outwardly under centrifugal action and bear against the inner surface of the annular casing 1.

Under high speed, the shoes would ordinarily bear heavily against the casing 1, and to avoid overheating I provide means for regulating the pressure of the shoes against the casing. Spiders 15 are mounted upon the shaft 8 to rotate with the rotor. Secured to these spiders are flat springs 16, the outer ends of which engage in slots formed in the ends of the rods 13. The spiders are clamped against the members 10, a nut 17 being threaded upon a threaded portion of the shaft 8 to exert the necessary pressure. The springs 16, when the rotor is rotated, tend to limit the outward rocking of the shoes 11. By loosening the nut 17, the spiders 15 may be rotated relative to the members 10, and then clamped in said adjusted position to regulate the action of the springs 16 as desired.

What I claim as my invention is:

1. In a liquid heater, the combination of a supporting frame; an annular hollow casing on said support forming a liquid jacket and provided with an inlet and outlet, and a rotor within the casing and journalled in said supporting frame, said rotor comprising a shaft; spaced members rotatable with said shaft; rubbing shoes each having one end pivoted between said members, the other end of each shoe being adapted to swing outwardly under centrifugal action as the rotor is rotated to bear against the inner surface of said casing; and means for yieldingly resisting the outward movement of the free ends of said rubbers.

2. In a liquid heater, the combination of a supporting frame; an annular hollow casing on said support forming a liquid jacket and provided with an inlet and outlet, and a rotor within the casing and journalled in said supporting frame, said rotor comprising a shaft; spaced members rotatable with said shaft; rubbing shoes each having one end pivoted between said members, the other end of each shoe being adapted to swing outwardly under centrifugal action as the rotor is rotated to bear against the inner surface of said casing; means for yieldingly resisting the outward movement of the free ends of said rubbers; and means for adjusting the resistance of said means.

3. In a liquid heater, the combination of an annular hollow stator forming a liquid jacket and provided with an inlet and outlet; a rotor within the stator; a rubbing shoe carried by the rotor and adapted to move outwardly under centrifugal force as the rotor rotates to frictionally engage the inner face of the stator; and means carried by the rotor for yieldingly resisting the outward movement of said shoe.

4. In a liquid heater, the combination of an annular hollow stator forming a liquid jacket and provided with an inlet and outlet; a rotor within the stator; a rubbing shoe carried by the rotor and adapted to move outwardly under centrifugal force as the rotor rotates to frictionally engage the inner face of the stator; means for yieldingly resisting the outward movement of said shoe; and means for adjusting the resistance of said means.

5. In a liquid heater, the combination of a supporting frame; an annular hollow casing on said support forming a liquid jacket and provided with an inlet and outlet, and a rotor within the casing and journalled in said supporting frame, said rotor comprising a shaft; spaced members rotatable with said shaft; rubbing shoes each having one end pivoted between said members, the other end of each shoe being connected with said members by a pin and slot connection whereby said end is adapted to swing outwardly under centrifugal action as the rotor is rotated to bear against the inner surface of said casing; and means for yieldingly resisting the outward movement of the free ends of said shoes, said means comprising spiders rotatable with said shaft, and springs carried by said spiders engaging the aforesaid pins.

JOHN W. ANDERSON.